Patented July 12, 1932

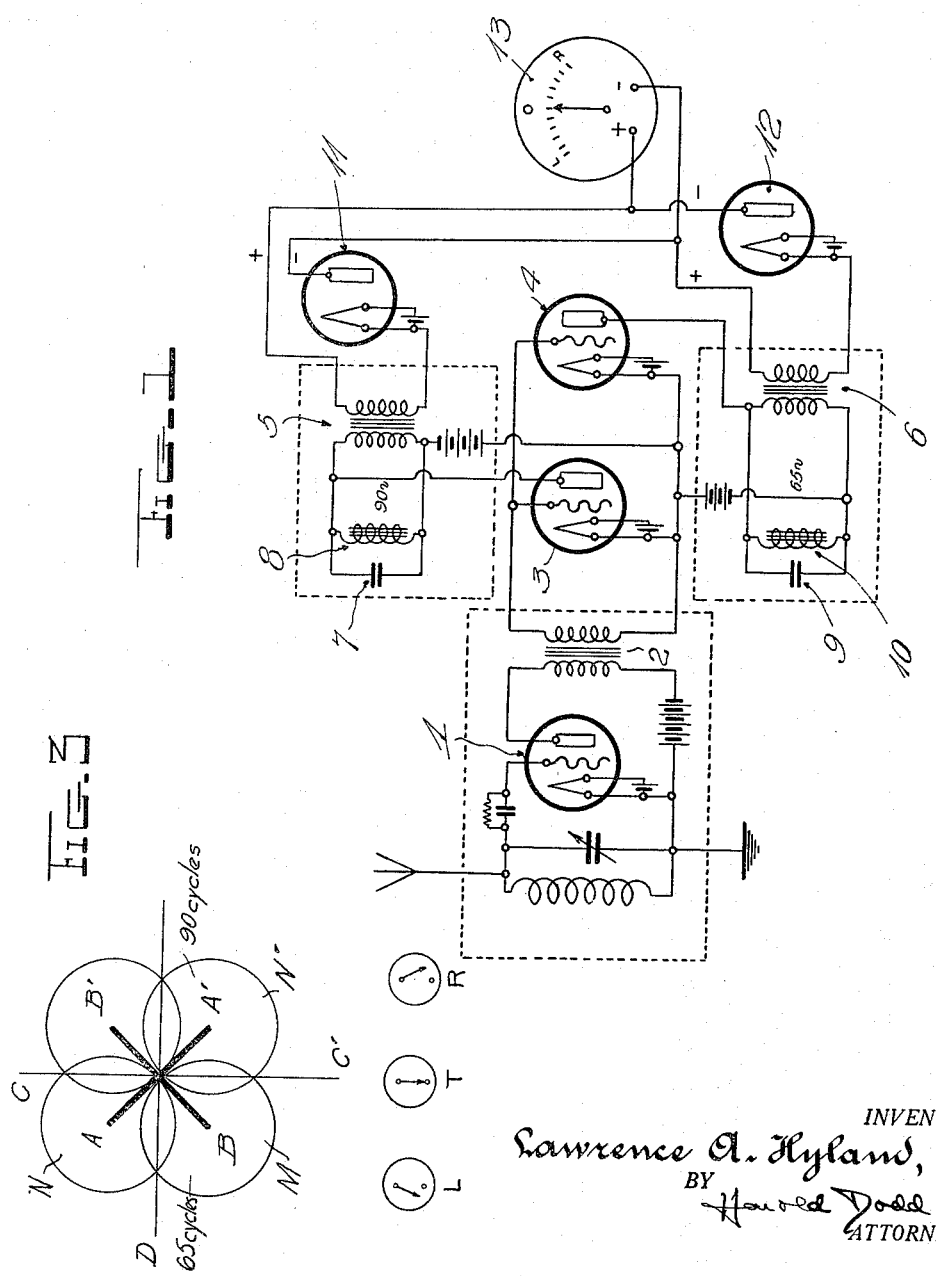

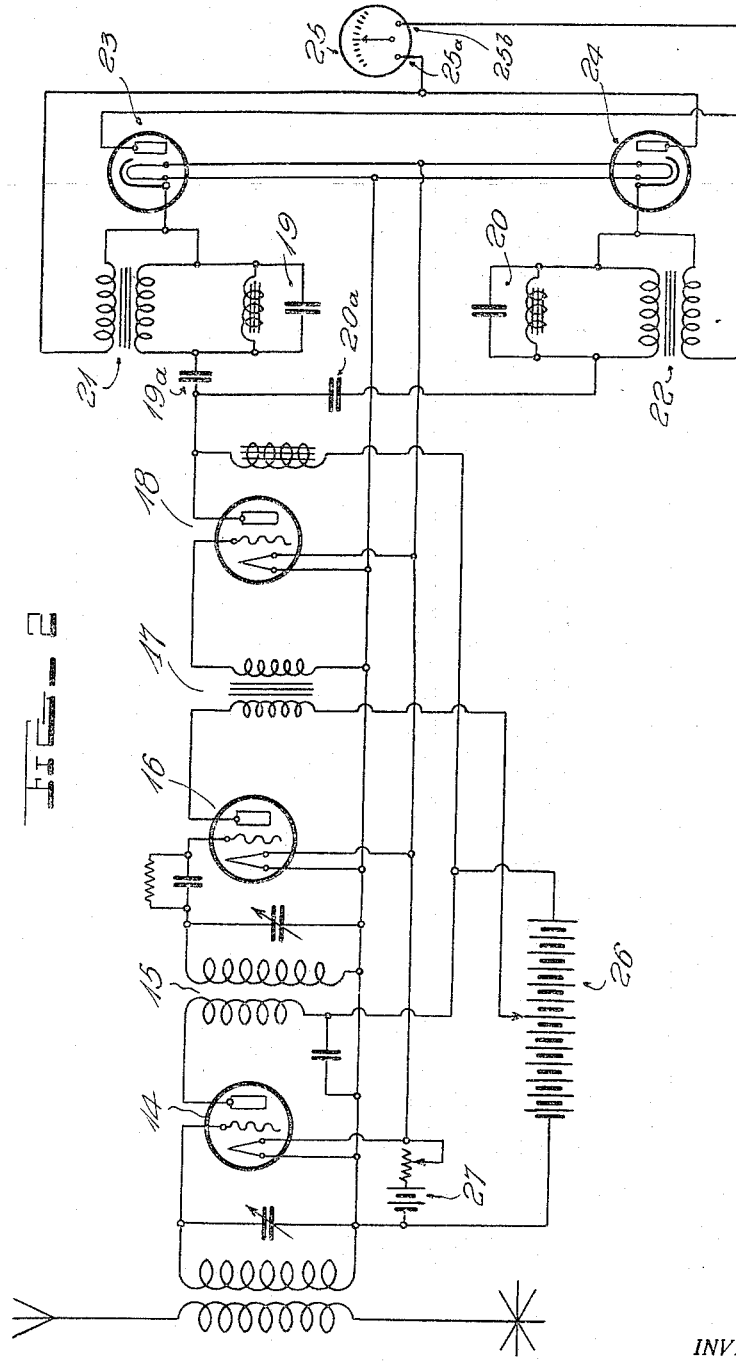

1,867,264

UNITED STATES PATENT OFFICE

LAWRENCE A. HYLAND, OF WASHINGTON, DISTRICT OF COLUMBIA, ASSIGNOR, BY MESNE ASSIGNMENTS, TO SEABOARD AIRWAYS, INC., OF COLUMBUS, OHIO, A CORPORATION OF DELAWARE

SIGNAL INDICATING SYSTEM

Application filed June 26, 1929. Serial No. 373,914.

My invention relates broadly to signal indicating systems and more specifically to circuit arrangements in which an indicator is caused to be deflected in either of two directions in accordance with changes in the ratio between the received energy of one frequency and the received energy of another frequency.

One of the objects of my invention is to provide an arrangement in which a plurality of selective circuits are disposed in the output circuit of an electron discharge device for transmitting energies of different wave forms to an indicating device.

Another object of my invention is to provide an arrangement in which a plurality of selective circuits are associated with the output circuit of an electron discharge device and with an indicating device in such a manner that electrical oscillations impressed upon one of the selective circuits will cause the indicator device to be deflected in one direction and electrical oscillations impressed upon another of the selective circuits will cause the indicator device to be deflected in another direction.

Still another object of my invention is to provide an arrangement in which modulated signaling energy is impressed upon a selective circuit and oscillations of a predetermined frequency selected by the circuit are caused to deflect an indicating device; another selective circuit provided in the arrangement is caused to select oscillations of another predetermined frequency and the latter oscillations are caused to deflect the indicating device in a sense opposite to that of its first deflection.

A further object of my invention is to provide a signal receiving system whereby the magnitude of the deviation of aircraft or other moving vessels form a determined course may be easily determined by employing an indicating device which has associated therewith frequency selective circuits operable to impress electrical energy of one polarity upon the indicating device when a predetermined frequency is impressed upon the selective circuits and electrical energy of another polarity when another predetermined frequency is impressed upon the selective circuits.

Other and further objects and features of my invention will be apparent from the following specification and the appended claims to those skilled in the art to which this invention pertains.

According to my invention a receiving system, which is adapted to receive high frequency signaling energy from a radio beacon transmitting signaling energy that is modulated by a plurality of low frequencies, is provided with a plurality of selective circuits each of which is adjusted to one of the low modulating frequencies.

The transmitting system at the radio beacon which is employed for guiding moving craft over a predetermined course is arranged to directionally transmit a carrier frequency that is modulated by a low frequency of, for example 65 cycles, along one side of the course and a carrier frequency that is moduated by another low frequency of, for example 90 cycles along the other side of the course. The signaling energy transmitted over the path to be followed by the moving craft is modulated by both of the low frequencies in such a manner that signals of equal intensity are obtained through both of the selective circuits employed in the receiving system when the moving craft is on the proper course.

An indicating instrument is associated with the selective circuits in such a manner that it will be deflected either in one direction or the other, depending upon the magnitude of the energization of the selective circuits associated therewith. If the signal modulated by the 90 cycle frequency predominates then the indicator is deflected in one direction whereas if the 65 cycle signal predominates the indicator is deflected in the other direction and the pilot of the moving craft is readily informed whether or not the craft is following the correct course. By observing the magnitude of the deflection of the indicator at a given signal strength the pilot can determine the amount of the deviation of the craft from its true course. Since the intensity of the signals along the true course is equal, the indicator is not deflected when the craft is proceeding directly along the course because the effects of the signals upon the indicator are neutralized.

The visual indicators generally used in guiding aircraft over a predetermined course over which signals are transmitted from radio beacons are subject to one of two general defects; either the magnitude of the power required to operate the beacon indicator is too large for practical work, or the indicator fails to register the degree of deviation of the moving craft from its course. Examples of the type of indicators now used are the reed indicator, which generally requires too high an input voltage for satisfactory operation, and the relay type indicator which operates on a smaller input voltage but does not show the degree of deviation of the moving craft from its course. The system of this invention embodies the good features of both the reed type and the relay type indicators, since through its use the pilot of the moving craft is informed not only when the craft deviates from its course but also the extent of the deviation. Furthermore the input voltage required to operate the indicator arrangement herein disclosed is on the order of one to two volts which is a signal strength that is comparatively easily obtained on an average aircraft receiver.

The details of this invention will be more easily understood from the specification and the drawings, in which:

Figure 1 illustrates a schematic diagram of connections employed in an embodiment of this invention; Fig. 2 illustrates a modified form of this invention; and Fig. 3 shows the field pattern or emission characteristic employed in the system of my invention.

In Fig. 1 of the drawings, reference numeral 1 designates an electron discharge device having its input circuit energized by signaling energy intercepted by an antenna and counterpoise arrangement. Where greater signal response is desired the usual high frequency amplifier illustrated in Fig. 2 of the drawings may be employed between the detector 1 and the antenna and counterpoise arrangement. The output circuit of the electron discharge device 1 is coupled to the input circuit of the electron discharge devices 3 and 4 by the transformer 2. Other coupling arrangements comprising impedance or resistance units may be employed in place of the transformer where it is more desirable or convenient. A transformer 5 is connected into the output circuit of the electron discharge device 3. A similar transformer 6 is connected into the output circuit of the electron discharge device 4. An absorption circuit or filter comprising the capacity 7 and the inductance 8 is connected across the primary of the transformer 5. Another absorption circuit or filter comprising the capacity 9 and the inductance 10 is connected across the primary of the transformer 6. Where it is desired these absorption circuits may be connected across the secondaries of the transformers 5 and 6, respectively. Rectifying devices 11 and 12 which may be of the electron discharge device type as illustrated, or of any other suitable type, are connected into the secondary circuits of transformers 5 and 6, respectively. The anode electrode of the device 11 is connected to a terminal of the indicating device 13, which is preferably a direct current meter, and a terminal of the secondary of transformer 6. The anode electrode of the device 12 is connected to the other terminal of the indicator 13 and a terminal of the secondary of the transformer 5. Connection is thus made between the anode of each rectifier and the cathode of the other.

The operation of the arrangement illustrated in Fig. 1 is as follows:

Signaling energy transmitted from the radio beacon is intercepted by the antenna and counterpoise and electrical oscillations are impressed upon the input circuit of the electron discharge device 1. Pulsating direct current modulated in accordance with the intercepted signaling energy is caused to flow in the primary circuit of the transformer 2 and low frequency alternating electromotive force is induced into the secondary windings of the transformer 2. When the signaling energy intercepted by the receiving system is modulated by a frequency corresponding to the frequency of the selective circuit including the capacity 7 and the inductance 8, the circuit of the rectifying device 11 is energized and the indicator device 13 is deflected to one side. The magnitude of the deflection of the indicator device 13 is proportional to the extent of the energization of the rectifier 11 or the readings correspond to the impressed energy according to some other relation. When the intercepted signaling energy is that which is modulated by a frequency corresponding to that of the selective circuit including the capacity 9 and the inductance 10, the rectifying device 12 is energized and the indicator 13 is deflected in the opposite direction. If the incoming signaling energy is modulated by frequencies corresponding to both of the selective circuits then both of the rectifying devices 11 and 12 are energized. When both of the rectifying devices 11 and 12 are energized equally the indicator 13 will not be deflected and the pilot observing the indicator is informed that the aircraft or similar craft being guided by the radio beacon is proceeding directly toward the beacon since the magnitude of the intercepted signaling energy from each of the course outlining directional signals is the same. If, however, the magnitude of the intercepted signaling energy from each of the course outlining directional signals is not the same, the indicator 13 is deflected to one side or the other depending upon which of the rectifying devices 11 or 12 is energized to a greater degree.

In Fig. 2 of the drawings, a modified form of the invention is illustrated in which an electron discharge device 14, which is coupled to the antenna and counterpoise system, is employed to increase the amplitude of the high frequency signals before they are impressed upon the circuits of the detector tube 16. Transformer 15 is employed to couple the output circuit of the amplifying device 14 and the detector tube 16. A low frequency transformer 17 is provided for coupling the output and the input circuits of the detector tube 16 and the amplifying electron discharge device 18. Absorption circuits 19 and 20 are connected into the anode circuit of the electron discharge device 18 through the capacities 19a and 20a. Transformers 21 and 22 are connected between the absorption circuits 19 and 20 and the rectifying tubes 23 and 24, respectively. The visual indicator 25 is connected to the secondary windings of transformers 21 and 22 and to the anode electrodes of the rectifying tubes 23 and 24, which are of the type in which the cathode is electrically isolated from its heating electrode.

When pulsating direct current, having an alternating component the frequency of which corresponds to the resonant frequency of the selective circuit 19, is impressed upon the output circuit of the electron discharge device 18 the rectifying device 23 impresses a positive potential upon the terminal 25a of the indicator 25 and the indicator 25 is caused to register a deflection which may be, for example to the left. When the alternating component of the pulsating direct current flowing in the output circuit of the electron discharge device 18 is of a frequency corresponding to the resonant frequency of the selective circuit 20, a positive potential is impressed upon the terminal 25b of the indicator 25 and a deflection to the right is registered thereby. If both of the rectifying devices 23 and 24 are energized simultaneously then the deflection of the indicator is proportional or corresponds to the difference of the currents impressed thereon through the joint operation of the rectifying devices and where the aircraft, employing this arrangement, is proceeding directly toward the beacon the deflection of the indicator 25 will be negligible since the selective circuits 19 and 20 are equally energized. In case the aircraft deviates from its true course the magnitude of the deviation is readily determinable from the indicator 25 in cases where the scale of the indicator is properly calibrated.

Fig. 3 shows the radiated field characteristic of a radio beacon of a type often employed for the purposes herein set forth. The particular radiating system shown consists of two similar coil antennæ AA' and BB' crossed at right angles. Radio frequency energy modulated at one low frequency such as 65 cycles is impressed on coil antenna BB' and causes a radiated field of the figure of eight characteristic MM'. Radio frequency energy modulated at another low frequency such as 90 cycles is impressed on coil antenna AA' and causes a radiated field of the figure of eight characteristic NN'. The field at a given point is the resultant of these two characteristics. On the extended common chords CC' and DD' the received energy modulated at 65 cycles is equal to the received energy modulated at 90 cycles. Thus when craft is located on the line CC', the indicator 13 will read zero. If the craft is located to the left of line CC', as at L, the pointer of indicator 13 will be displaced to the left of zero an amount depending on how far the craft is to the left of line CC'. Likewise if the craft is to the right of line CC', as at R the pointer of indicator 13 will be displaced to the right of zero, an amount depending on how far the craft is to the right of line CC'.

While I have described my invention in certain of its preferred embodiments I desire it understood that modifications of it may be made without departing from the spirit and scope thereof and that, therefore, I do not desire to limit this invention to the exact details so set forth in the foregoing specification except in so far as these details may be defined by the appended claims.

What I claim as new and desire to secure by Letters Patent of the United States is as follows:

1. In a direction finding system employing a directive radio transmitting station emitting two radio frequency waves directed in different directions and modulated at different audio frequencies, a receiving station comprising a receiving antenna, an electron tube deflector having its input connected to said receiving antenna, a pair of audio frequency filters a pair of audio frequency amplifiers comprising a pair of electron tubes having their input circuits connected in parallel to the output of said detector and having their output circuits connected individually to said filters, a pair of rectifier tubes having their inputs respectively connected to each of said filters and having their output circuits connected together in mutually opposed polar relation, and an indicating device connected to the output circuit of said rectifier tubes and adapted to indicate the polarity and magnitude of the voltage effective in said output circuit, said filters being respectively adapted to pass one of the audio frequencies employed for modulation at said transmitting station and to exclude the other of said modulating frequencies, whereby said indicator indicates the location of said receiving station with reference to the directions of the directed waves emitted from said transmitting station.

2. In a system for comparing the magnitudes of two superposed radiated fields having differing frequency and directional characteristics, a receiving antenna, an electron tube detector having its input connected to said antenna, a pair of filters, a pair of electron tubes having their input circuits connected in parallel to the output of said detector and having one of their output circuits connected to one of said filters and the other of said output circuits connected to the other of said filters, a pair of rectifier tubes having their inputs respectively connected to each of said filters and having their output circuits connected together in mutually opposed polar relation, and an indicating device connected to the output circuit of said rectifier tubes and adapted to indicate the polarity and magnitude of the voltage effective in said output circuit, one of said filters being adapted to pass the frequency charactertistic of one of said radiated fields and to exclude the frequency characteristic of the other of said radiated fields, the other of said filters being adapted to pass the frequency characteristic of the other of said radiated fields and to exclude the frequency charactertisic of the first of said radiated fields, whereby said indicator indicates the location of said receiving antenna with reference to the directions of the directive radiated fields received on said antenna.

3. In a system for determining the location of a radio receiving station with reference to the directions of propagation of two waves radiated in different directions and modulated at different audio frequencies, a receiving antenna, an electron tube detector having its input connected to said receiving antenna, a pair of filters, a pair of electron tubes having their inputs connected to the output of said detector and having their output circuits connected one to each of said filters, a pair of rectifier tubes having their inputs respectively connected to each of said filters and having their output circuits connected together in mutually opposed polar relation, and an indicating device connected to the output circuit of said rectifier tubes and adapted to indicate the polarity and magnitude of the voltage effective in said output circuit, said filters being respectively adapted to pass one of the audio frequencies employed for modulating said radiated waves and to exclude the other of said modulating frequencies, whereby said indicator indicates the location of said receiving antenna with reference to the directions of propagation of said radiated waves.

4. In a system for determining the location of a radio receiving station with reference to the directions of propagation of two waves radiated in different directions and modulated at different audio frequencies, a receiving antenna, an electron tube detector having its input connected to said receiving antenna, a pair of electron tubes having their inputs connected to the output of said detector tube, a pair of filters respectively connected to the output of each of said pair of electron tubes, a pair of rectifier tubes having their inputs respectively connected to each of said filters and having their output circuits connected together in mutually opposed polar relation, and an indicating device connected to the output circuit of said rectifier tubes and adapted to indicate the polarity and magnitude of the voltage effective in said output circuit, said filters being respectively adapted to pass one of the audio frequencies employed for modulating said radiated waves and to exclude the other of said modulating frequencies, whereby said indicator indicates the location of said receiving antenna with reference to the directions of propagation of said radiated waves.

5. In a course indicating system employing a directive radio transmitting station emitting two radio frequency waves directed in different directions and modulated at different audio frequencies, a receiving station comprising a receiving antenna, an electron tube detector having its input connected to said receiving antenna, a pair of electron tubes having their inputs connected to the output of said detector tube, a pair of filters respectively connected to the output of each of said pair of electron tubes, a pair of rectifier tubes having their inputs respectively connected to each of said filters and having their output circuits connected together in mutually opposed polar relation, and an indicating device connected to the output circuit of said rectifier tubes and adapted to indicate the polarity and magnitude of the voltage effective in said output circuit, said filters being respectively adapted to pass one of the audio frequencies employed for modulation at said transmitting station and to exclude the other of said modulating frequencies, whereby said indicator indicates the location of said receiving station with reference to the course whereon said waves are radiated with equal intensity.

LAWRENCE A. HYLAND.